(12) United States Patent
Kim

(10) Patent No.: US 11,019,520 B2
(45) Date of Patent: May 25, 2021

(54) MOBILE ITS STATION AND METHOD FOR OPERATING MOBILE ITS STATION

(71) Applicant: LG ELECTRONICS INC., Seoul (KR)

(72) Inventor: Soyoung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 14 days.

(21) Appl. No.: 16/325,559

(22) PCT Filed: May 30, 2018

(86) PCT No.: PCT/KR2018/006138
§ 371 (c)(1),
(2) Date: Feb. 14, 2019

(87) PCT Pub. No.: WO2018/230866
PCT Pub. Date: Dec. 20, 2018

(65) Prior Publication Data
US 2019/0182700 A1    Jun. 13, 2019

Related U.S. Application Data

(60) Provisional application No. 62/519,132, filed on Jun. 13, 2017.

(51) Int. Cl.
*H04W 28/02*  (2009.01)
*H04W 4/46*  (2018.01)
(Continued)

(52) U.S. Cl.
CPC ......... *H04W 28/0205* (2013.01); *H04L 63/18* (2013.01); *H04W 4/40* (2018.02);
(Continued)

(58) Field of Classification Search
None
See application file for complete search history.

(56) References Cited

U.S. PATENT DOCUMENTS 10,484,351 B2* 11/2019 Romansky .............. H04L 63/06
2013/0301611 A1* 11/2013 Baghel .................. H04L 63/123
370/331

(Continued)

FOREIGN PATENT DOCUMENTS

KR    10-2017-0036623 A    4/2017
WO    WO 2016/013826 A1    1/2016
(Continued)

*Primary Examiner* — Ajit Patel
*Assistant Examiner* — Richard Schnell
(74) *Attorney, Agent, or Firm* — Birch, Stewart, Kolach & Birch, LLP

(57) ABSTRACT

A method of operating a mobile ITS (intelligent transport system) station including a hybrid V2X control system capable of supporting a first interface according to a first communication scheme and a second interface according to a second communication scheme at the same time is proposed.
The mobile ITS station transmits transmission signals of the mobile ITS station via the first interface in a first traffic state. In this case, a second traffic state is distinguished from the first traffic state according to a traffic congestion level and whether or not an emergency situation occurs. The mobile ITS station transmits an SCM among the transmission signals of the mobile ITS station via the second interface in the second traffic state. The mobile ITS station transmits a signal other than the SCM among the transmission signals of the mobile ITS station via the first interface in the second traffic state.

13 Claims, 12 Drawing Sheets

(51) Int. Cl.
  *H04W 4/40* (2018.01)
  *H04W 88/06* (2009.01)
  *H04L 29/06* (2006.01)
  *H04W 12/06* (2021.01)

(52) U.S. Cl.
  CPC ............ *H04W 4/46* (2018.02); *H04W 12/06* (2013.01); *H04W 28/02* (2013.01); *H04W 88/06* (2013.01)

(56) References Cited

U.S. PATENT DOCUMENTS

| | | | |
|---|---|---|---|
| 2015/0326668 A1 | 11/2015 | Mäder et al. | |
| 2017/0201461 A1* | 7/2017 | Cheng | H04L 47/286 |
| 2018/0285658 A1* | 10/2018 | Gunther | G08G 1/161 |
| 2019/0174547 A1* | 6/2019 | Khoryaev | H04B 17/318 |
| 2019/0200228 A1* | 6/2019 | Adrangi | H04L 9/083 |

FOREIGN PATENT DOCUMENTS

| | | | | |
|---|---|---|---|---|
| WO | WO 2017/030348 A1 | 2/2017 | | |
| WO | WO 2017/052488 A1 | 3/2017 | | |
| WO | WO-2017052488 A1 * | 3/2017 | ....... | G08G 1/096783 |

* cited by examiner

FIG. 1

| Application layer | | Non-safety Application | safety application (SAE J2735) |
|---|---|---|---|
| Transport layer | | TCP/UDP | WSMP IEEE 1609.3 Security IEEE 1609.2 |
| Network layer | | IPV6 | |
| Data link layer | LLC | IEEE 802.2 | |
| | MAC Extension | IEEE 1609.4 | |
| | MAC | IEEE 802.11p | |
| Physical layer | | IEEE 802.11p | |

FIG. 9

| Interface Combination | V2V | | SCM | |
|---|---|---|---|---|
| | Normal | Congestion / Emergency | Normal | Congestion / Emergency |
| Primary Interface | ITS-G5 | ITS-G5 for more safety / short latency | ITS-G5 / IPv6 | LTE-Uu |
| Secondary Interface | ITS-G5 | LTE-PC5 for less safety | LTE-Uu | ITS-G5 / IPv6 |

MOBILE ITS STATION AND METHOD FOR OPERATING MOBILE ITS STATION

CROSS REFERENCE TO RELATED APPLICATIONS

This application is the National Phase of PCT International Application No. PCT/KR2018/006138, filed on May 30, 2018, which claims priority under 35 U.S.C. 119(e) to U.S. Provisional Application No. 62/519,132, filed on Jun. 13, 2017, all of which are hereby expressly incorporated by reference into the present application.

BACKGROUND OF THE INVENTION

Field of the Invention

The present invention relates to a method of operating a mobile ITS (intelligent transport system) station, and more particularly, to a method of operating a mobile ITS (intelligent transport system) including a hybrid V2X (vehicle to everything) control system capable of supporting a first interface according to a first communication scheme and a second interface according to a second communication scheme at the same time.

Discussion of the Related Art

Traditionally, a vehicle functions as means of transportation of a user. Yet, various sensors and electronic devices are mounted on the vehicle for the convenience of the user to provide driving convenience to the user. In particular, an ADAS (advanced driver assistance system) for the driving convenience of the user as well as an autonomous vehicle are actively developing.

The technologies for the ADAS and the autonomous vehicle have started from an initial sensing-based technology and a service range of the technologies is expanding based on V2X (vehicle-to-everything) communication.

The V2X corresponds to a technology containing a V2V (vehicle-to-vehicle), V2I (vehicle-to-infrastructure), V2P (vehicle-to-pedestrian), and the like. The V2X is developing via a standardization procedure in IEEE and 3GPP described in the following.

First of all, IEEE has developed WAVE (wireless access for the vehicular environment) in 2010 and the WAVE is a concept including description for a physical layer and a MAC layer for vehicle communication in a form of IEEE 802.11p and description for security, network management, and the like in a form of IEEE 1609. Meanwhile, based on the abovementioned technology, a DSRC (dedicated short-range communication) technology has been recently developed as an application technology for an ITS (intelligent transport system) related to road safety. Recently, ETSI has developed ITS-G5 based on the aforementioned technology. The ITS-G5 corresponds to a technology for a higher layer to perform V2V communication. A lower layer is still using a legacy IEEE 802.11p technology.

Meanwhile, 3GPP has announced a mode 3/4 as a mode for V2X in LTE Release 14 by expanding a technology for a previously provided sidelink. Moreover, NR (New RAT) corresponding to $5^{th}$ generation communication is studying on a technology for V2V communication under the name of eV2X.

SUMMARY OF THE INVENTION

A legacy V2X system has discussed about a V2X system to be used depending on V2V or V2I. For example, IEEE 802.11ip-based DRRC interface or ITS-G5 interface is used for V2V, whereas 3GPP-based LTE-Uu interface is used for V2I. The legacy V2X system has problems described in the following.

First of all, according to the use cases of V2X, V2I, and I2V, a distinctive name for communicating additional messages necessary for authenticating a mutual message is not considered. In V2V communication, such a definition as a signed message of its own attached to a CAM (cooperative awareness message), a DENM (decentralized environmental notification message) is forwarded using V2I or I2V is defined only. It is preferable to distinguish communication of signed messages from communication of a service application that actually transmits and receives transportation information related to safety.

Secondly, although a message is used for V2V message communication, a transmission frequency of the message and the like may vary depending on an importance level or a priority of the message. A value for the importance level or the priority can be determined in advance. However, the legacy V2X system does not have any solution for efficiently selecting a communication interface in a hybrid communication using the information.

Thirdly, a hybrid message control system for efficiently managing and analyzing all messages transmitted and received in a plurality of communication modules does not exist.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

One embodiment of the present invention proposes a hybrid V2X (vehicle to everything) control system configured to process transmission signals of a mobile ITS station via a separate communication interface by dividing the transmission signals into an SCM (security credential message) and a V2V signal. By doing so, it is able to reduce latency for actual V2V safety and more flexible handle a congestion situation via hybrid communication.

According to a different embodiment of the present invention, it is able to separately process a V2V signal among transmission signals of a mobile ITS station using ITS-G5 interface and LTE-PC5 interface according to QoS (quality of service) such as delay time, a signal priority, and the like. In case of an SCM, ITS-G5 interface and LTE-Uu interface can be variably applied to the SCM according to whether or not there is an infrastructure in a specific region. By doing so, coverage capable of performing V2V communication can be enlarged.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram illustrating a DSRC interface-based V2X system structure;

FIGS. 9 and 10 are diagrams for explaining communication according to a message and a situation for providing a hybrid V2X (vehicle to everything) control system according to an embodiment of the present invention;

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

FIG. 1 is a diagram illustrating a DSRC interface-based V2X system structure.

Referring to FIG. 1, it is able to see that a DSRC (dedicated short range communications) interface is configured by a set of standard protocols. The DSRC interface uses WAVE (wireless access for vehicular environment)-based IEEE 802.11p as a standard of a physical layer corresponding to a lower layer and a MAC layer. And, IEEE 1609.4 standard is used as a MAC layer extension for channel switching.

In the DSRC interface, V2V communication is performed based on the exchange of safety messages and certificate exchange messages. One embodiment of the present invention proposes to efficiently perform hybrid V2X communication by distinguishing a V2V signal from an SCM (security credential message). If the hybrid V2X communication proposed by the present embodiment is used, it is able to reduce latency for V2V safety and more flexibly handle a congestion situation.

Meanwhile, in the DSRC interface, the safety messages are used to support a safety application (SAE J2735, refer to FIG. 1) and the certificate exchange messages are used to ensure that a source of the safety messages is reliable. Since the safety messages are transmitted using a standardized format, all other vehicles belonging to a network can read the safety messages.

Figure 2:
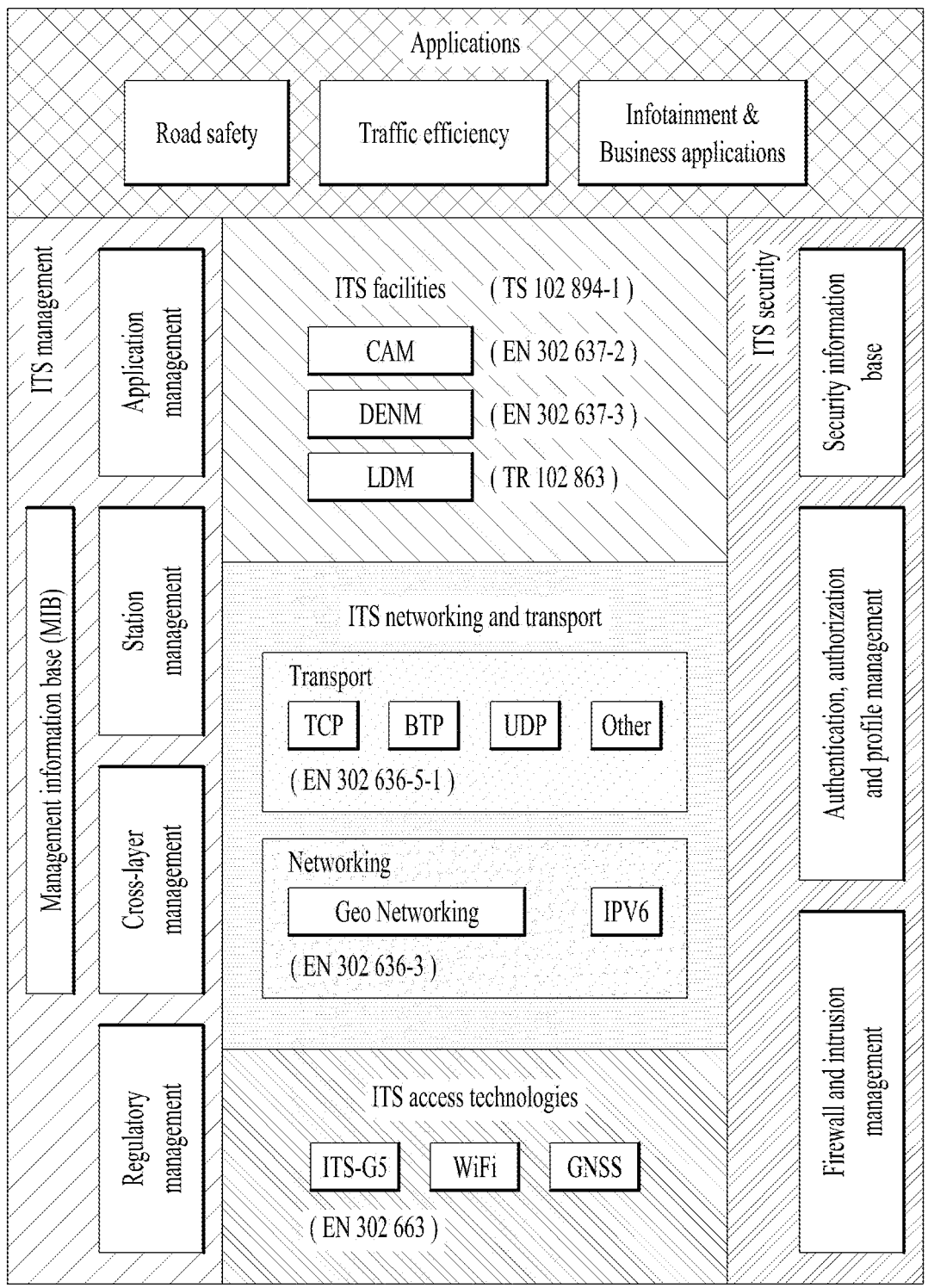
FIG. 2 is a diagram illustrating an ITS-G5 interface-based V2X system structure.

FIG. 2 is a diagram illustrating an ITS-G5 interface-based V2X system structure.

ITS-G5 has been developed by ETSI for C-ITS based on IEEE 802.11p and IEEE 1609.x. The ITS-G5 corresponds to an upper layer technology for performing V2V communication. A legacy IEEE 802.11p technology is still used by a lower layer.

Referring to FIG. 2, an access layer of the ITS-G5 uses various access technologies supporting a PHY layer and a MAC layer similar to ITS-G5, 802.11, and the like. A security layer of the ITS-G5 provides services such as firewall and intrusion management, authentication, authorization and profile management, and the like. A management layer of the ITS-G5 defines management information base (MIB) for a data set and a variable. Such a legacy network/transport protocol as IPV6, TCP, and UDP can support an ITS-related protocol.

If a protocol of the ITS-G5 interface is used, it is able to perform V2V communication without using a centralized infrastructure. A geo-networking protocol, which is one of the protocols of the ITS-G5 interface, can route a packet according to a geographic location of a vehicle. A geo-unicast service and a geo-broadcast service are supported by the geo-networking protocol. Meanwhile, a BTP (basic transport protocol) corresponds to a light weight protocol capable of providing a transmission service without an end-to-end connection. The BTP plays a role of a bridge that forwards control information between an ITS facilities layer and the geo-networking protocol.

In the facilities layer of the ITS-G5 interface, a CAM provides information on a nearby vehicle or information on a network node (e.g., RSU) and a DENM provides information on a nearby danger. In this case, it is necessary for each of ITS stations to support a local dynamic map (LDM). The LDM provides both static information and dynamic information based on a data model.

Figure 3:
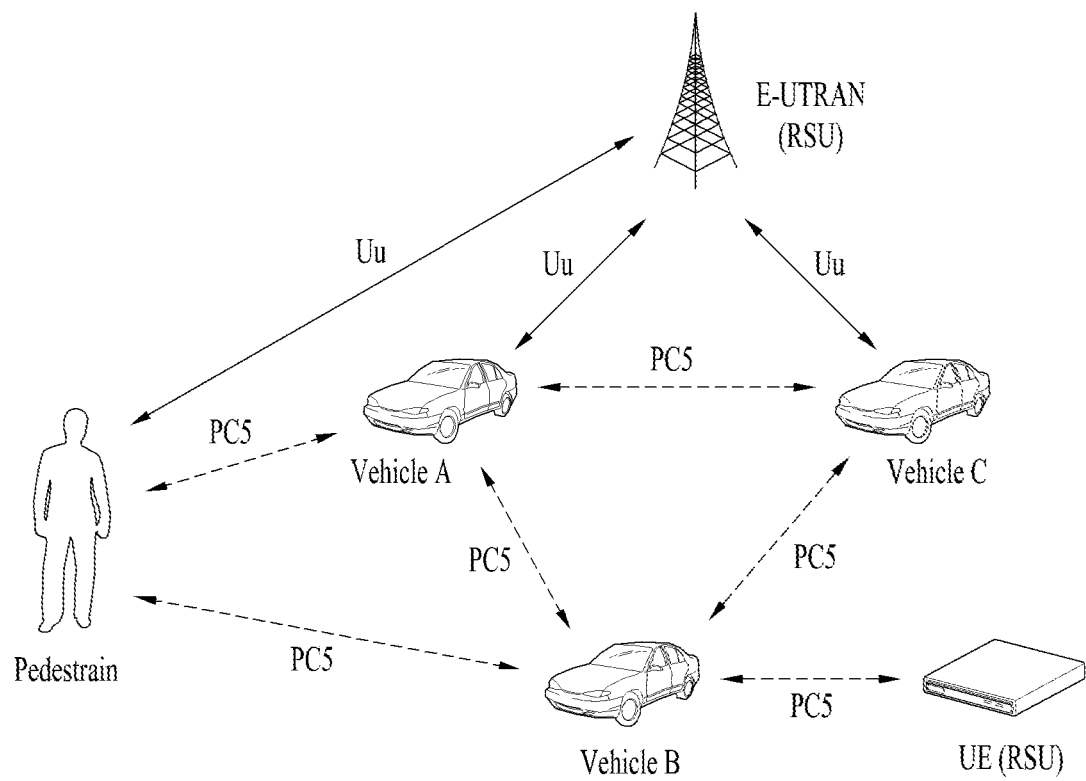
FIG. 3 is a diagram illustrating a 3GPP LTE-A-based V2X system.

FIG. 3 is a diagram illustrating a 3GPP LTE-A-based V2X system.

Although an NR-based interface is used, it is able to apply the same system.

In a 3GPP-based cellular system, an interface between a UE (user equipment) and E-UTRAN via an eNB/gNB is defined as Uu interface, a link from the UE to the E-UTRAN is defined as an uplink, and a link from the E-UTRAN to the UE is defined as a downlink. And, as shown in FIG. 3, in a 3GPP cellular system, a link between UEs is defined as a PC5 interface and the PC5 interface is defined as a sidelink in a lower layer. As shown in FIG. 3, depending on a case, the eNB/gNB of the E-UTRAN may operate as an RSU. Or, a specific UE may operate as an RSU.

One embodiment of the present invention proposes a method of operating a mobile ITS (intelligent transport system) including a hybrid V2X (vehicle to everything) control system capable of supporting a first interface according to a first communication scheme and a second interface according to a second communication scheme at the same time.

According to a different embodiment of the present invention, a method of operating a mobile ITS station transmits transmission signals of the mobile ITS station via the first interface in a first traffic state. In this case, it may be able to define a second traffic state distinguished from the first traffic state according to a traffic congestion level and whether or not an emergency situation occurs. In the second traffic state, an SCM (security credential message) among the transmission signals of the mobile ITS station is transmitted via the second interface and signals other than the SCM among the transmission signals of the mobile ITS station are transmitted via the first interface. Regarding this, it shall be explained later with reference to FIGS. 7 to 10.

Meanwhile, the second interface according to the second communication scheme corresponds to an interface between the mobile ITS station and a network node. The hybrid V2X control system additionally includes a third interface corresponding to an interface between the mobile ITS station according to the second communication scheme and a different mobile ITS station.

A network node corresponds to each of network entities in IEEE 802.11p-based DSRC interface, 3GPP-based LTE-Uu interface, and LTE-PC5 interface. In the present specification, for clarity, the network node is explained with an example of an RSU of the DSRC interface.

Meanwhile, the first communication scheme may correspond to IEEE 802.11-based communication scheme and the second communication scheme may correspond to 3GPP-based communication scheme. And, the first interface may correspond to an ITS-G5 interface or a DSRC interface, the second interface may correspond to a 3GPP-based Uu interface, and the third interface may correspond to a 3GPP-based PC5 interface.

Figure 4:
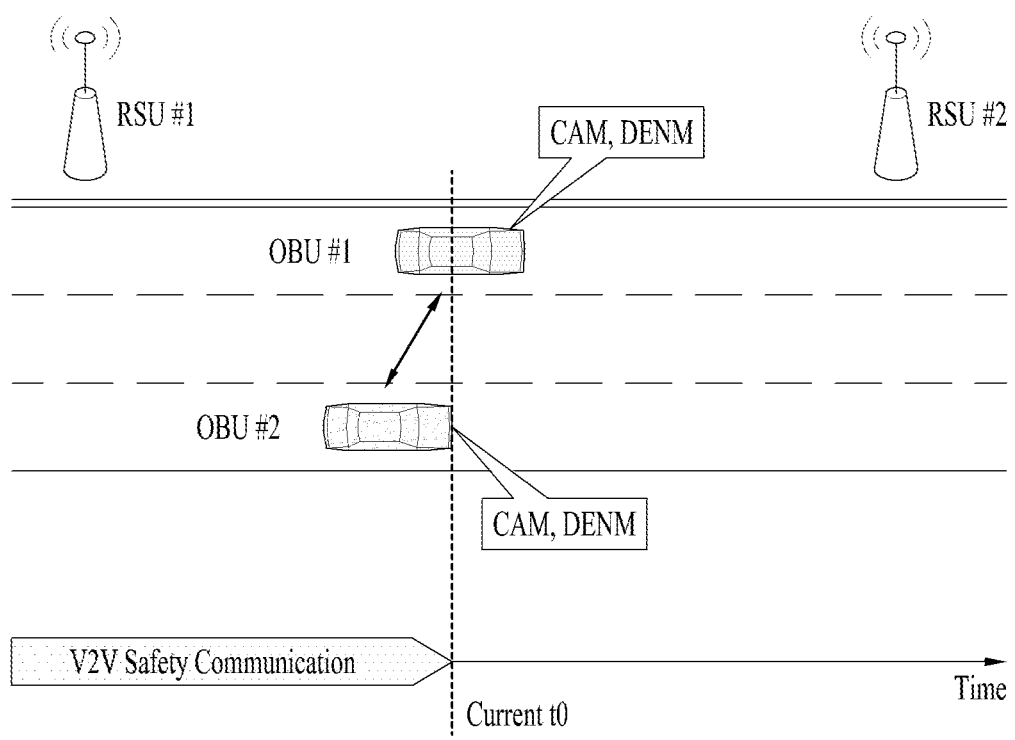
FIG. 4 is a diagram for explaining a message related to a V2V signal among transmission signals of a mobile ITS station according to an embodiment of the present invention.

FIG. 4 is a diagram for explaining a message related to a V2V signal among transmission signals of a mobile ITS station according to an embodiment of the present invention.

Specifically, FIG. 4 illustrates a case that mobile ITS stations transmit and receive a V2V signal via an ITS-G5 interface or a DSRC interface.

In a first interface (e.g., ITS-G5 interface), a mobile ITS station generates a CAM and a DENM. The mobile ITS station generates the CAM including information on the existence of the mobile ITS station, information a location of the mobile ITS station, and information on a basic state for communication and can provide the CAM to neighboring mobile ITS stations within a single hop distance. The DENM can include information on a dangerous element of a road, information on an abnormal traffic status, and information on a type and a location of the abnormal traffic status.

The generated CAM and the DENM can be used for performing V2V communication between mobile ITS stations. Meanwhile, the CAM and the DENM can be defined based on ETSI EN 302 637-2 and ETSI EN 302 637-3 in the ITS-G5 interface. Meanwhile, in the DSRC interface, it may be able to use safety messages defined in SAE J2735 as a concept corresponding to the CAM and the DENM.

Figure 5:
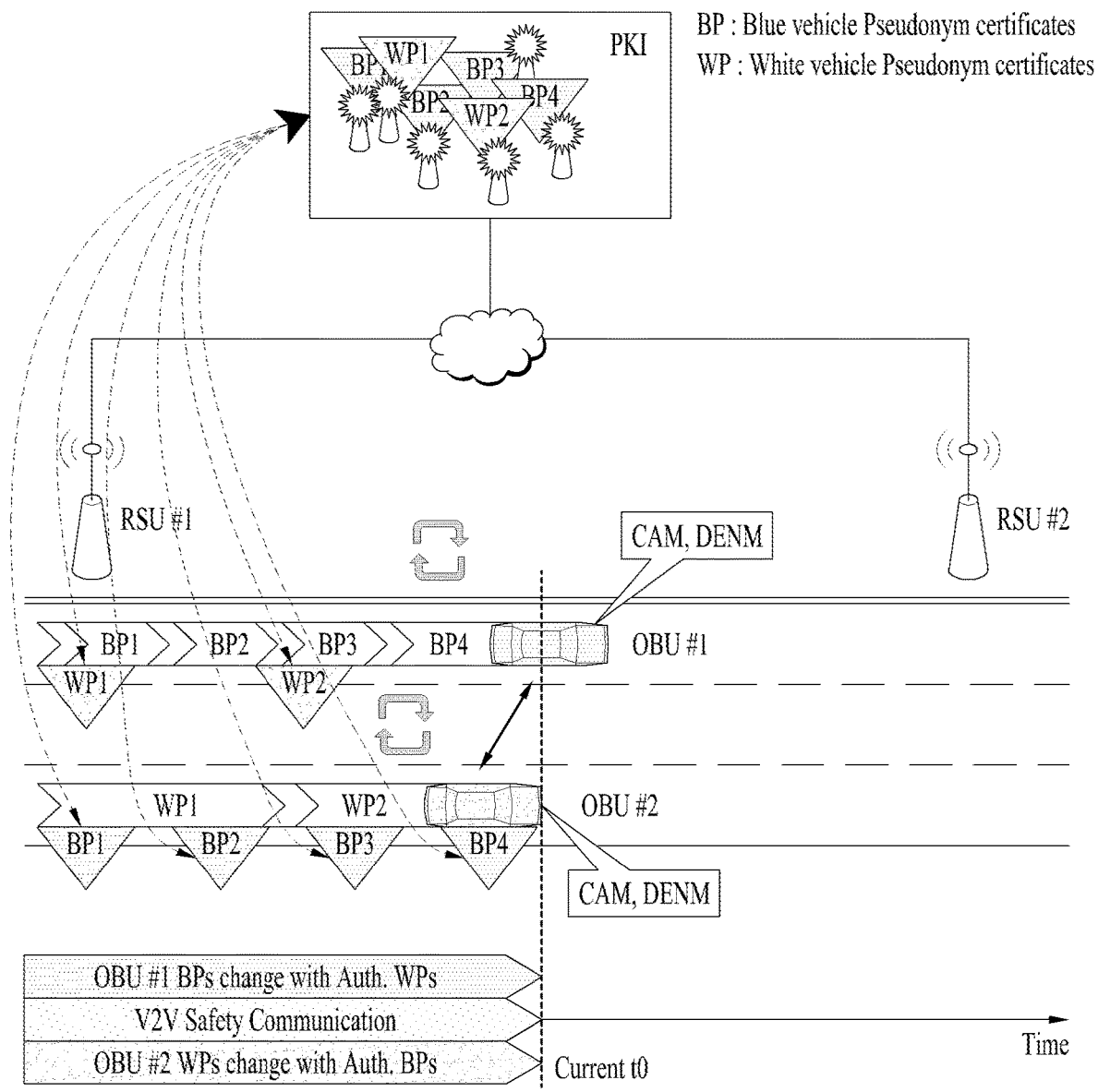
FIGS. 5 and 6 are diagrams for explaining an SCM (security credential message) among transmission signals of a mobile ITS station according to an embodiment of the present invention.
Figure 6:
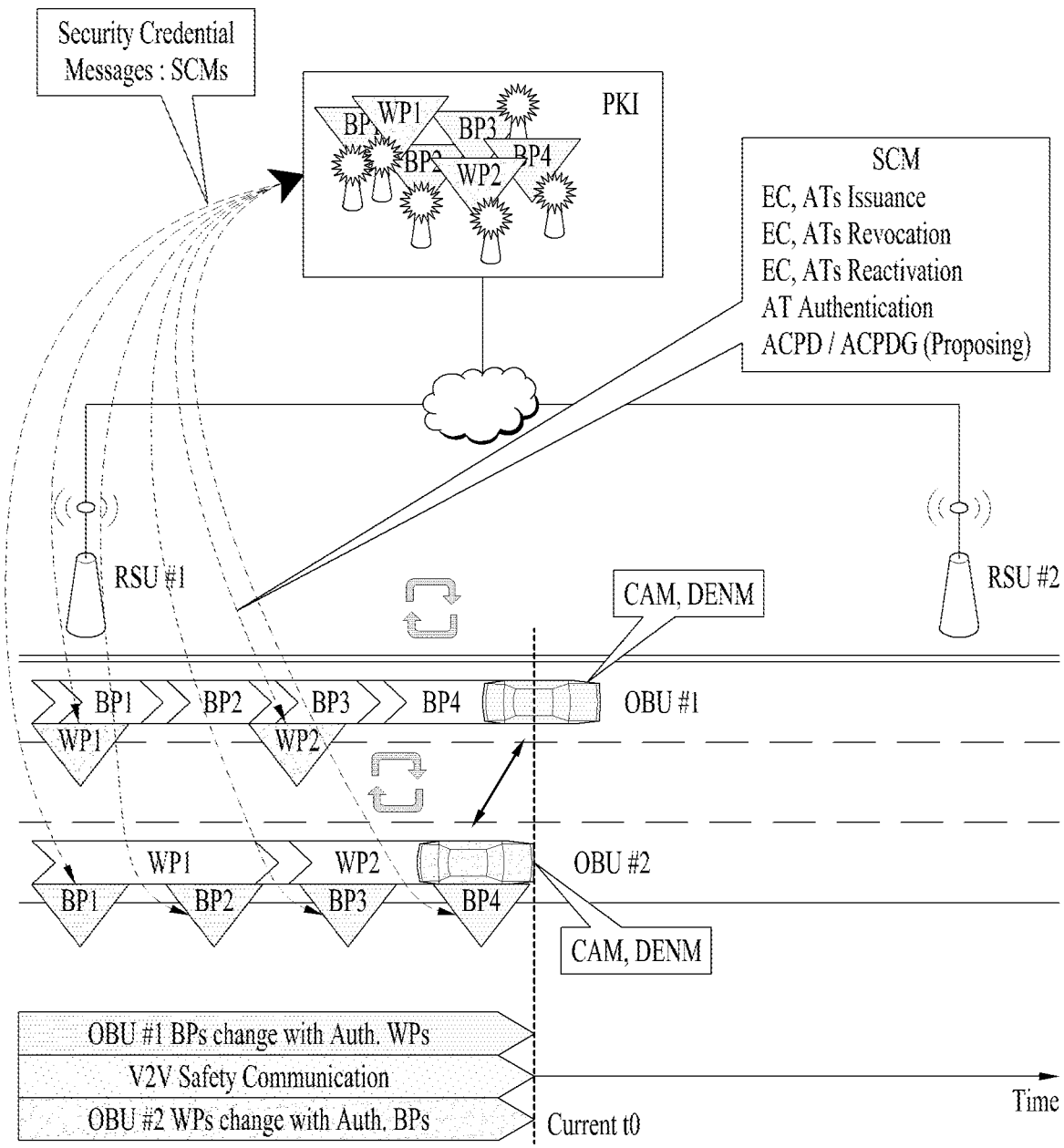

FIGS. 5 and 6 are diagrams for explaining an SCM (security credential message) among transmission signals of a mobile ITS station according to an embodiment of the present invention.

According to one embodiment of the present invention, transmission signals transmitted by a mobile ITS station include not only a V2V signal mentioned earlier in FIG. 4 but also a message of a different type (e.g., SCM). The SCM corresponds to a message for authenticating messages transmitted and received between mobile ITS stations or between a mobile ITS station and a network node via a communication interface.

In FIG. 5, a PKI (public key infrastructure) can be comprehended as an entity that manages a certificate related to an SCM. According to an embodiment of the present invention, the SCM may correspond to a signal related to issuance, revocation, or reactivation of at least one of an EC (enrollment) and an AT (authorization ticket). The EC (enrollment), the AT (authorization ticket), and a PC (pseudonym certificate) related to the SCM are explained in the following.

The EC (enrollment certificate) is like a passport of a mobile ITS station and a passport of a network node. The EC corresponds to a certificate for authenticating such an end entity as the mobile ITS station and the network node. The EC corresponds to a long-term certificate. Such an institution as EA (enrollment authorities) can issue the EC for the end-entities including the mobile ITS station and the network node. The EC is used only for communication with an SCMS (security credential management system). It is preferable not to use the EC for communication with other end-entities.

The AT (authorization ticket) is used for authorizing a message transmitted and received between mobile ITS stations. For example, the message transmitted and received between mobile ITS stations may correspond to a CAM or a DENM included in the aforementioned V2V signal.

The PC (pseudonym certificate) is mainly used for authorizing a BSM (basic safety message) and reporting misbehavior. The PC does not have an encryption key. Due to a privacy reason, a single mobile ITS station has a plurality of valid PCs. In particular, the PC may change if necessary.

FIG. 6 is a diagram illustrating an example of a V2V scenario related to security of an ITS-G5 interface or a DSRC interface according to an embodiment of the present invention.

According to an embodiment of the present invention, transmission signals of a mobile ITS station consist of a V2V (vehicle-to-vehicle) signal and an SCM (security credential message). In FIG. 6, an SCM corresponding to a message for authenticating a message related to a V2V signal and an SCMS reliability model structure are explained.

As mentioned in the foregoing description, the SCM corresponds to a signal related to issuance, revocation, or activation of at least one of the EC and the AT. The EC is issued by the EA (enrollment authorities) and the AT is issued by an AA (authorization authority). Misbehavior of a mobile ITS station or a network node may cause a fatal accident. Hence, a list of certificates of the mobile ITS station or the network node not reliable anymore (i.e., CRL (certificate revocation list)) can be made and distributed by a relevant institute.

In the SCMS reliability model structure of the ITS-G5 interface, PA (policy authority) designates a TLM (trust list manager) and authenticates an RCA (root credential authority) operation and the TLM confirms RCAs. Meanwhile, the TLM issues an ECTL (European certificate trust list) and the ECTL can provide a list of authenticated RCAs. Subsequently, the authenticated RCAs can issue a certificate for EA (enrollment authority) and AA (authorization authority). Subsequently, the EA can forward EC (enrollment certificate) to an EE (endOentity) or a mobile ITS station. The AA can issue AT (authorization ticket) for an EE trusted by the EA or mobile ITS stations.

A single mobile ITS station may trust a different mobile ITS station through the abovementioned SCMS reliability model structure. This is because ATs are issued by the AA, reliability of the AA is authenticated by the RCA, and the RCA is authenticated by the TLM and the PA.

Figure 7:
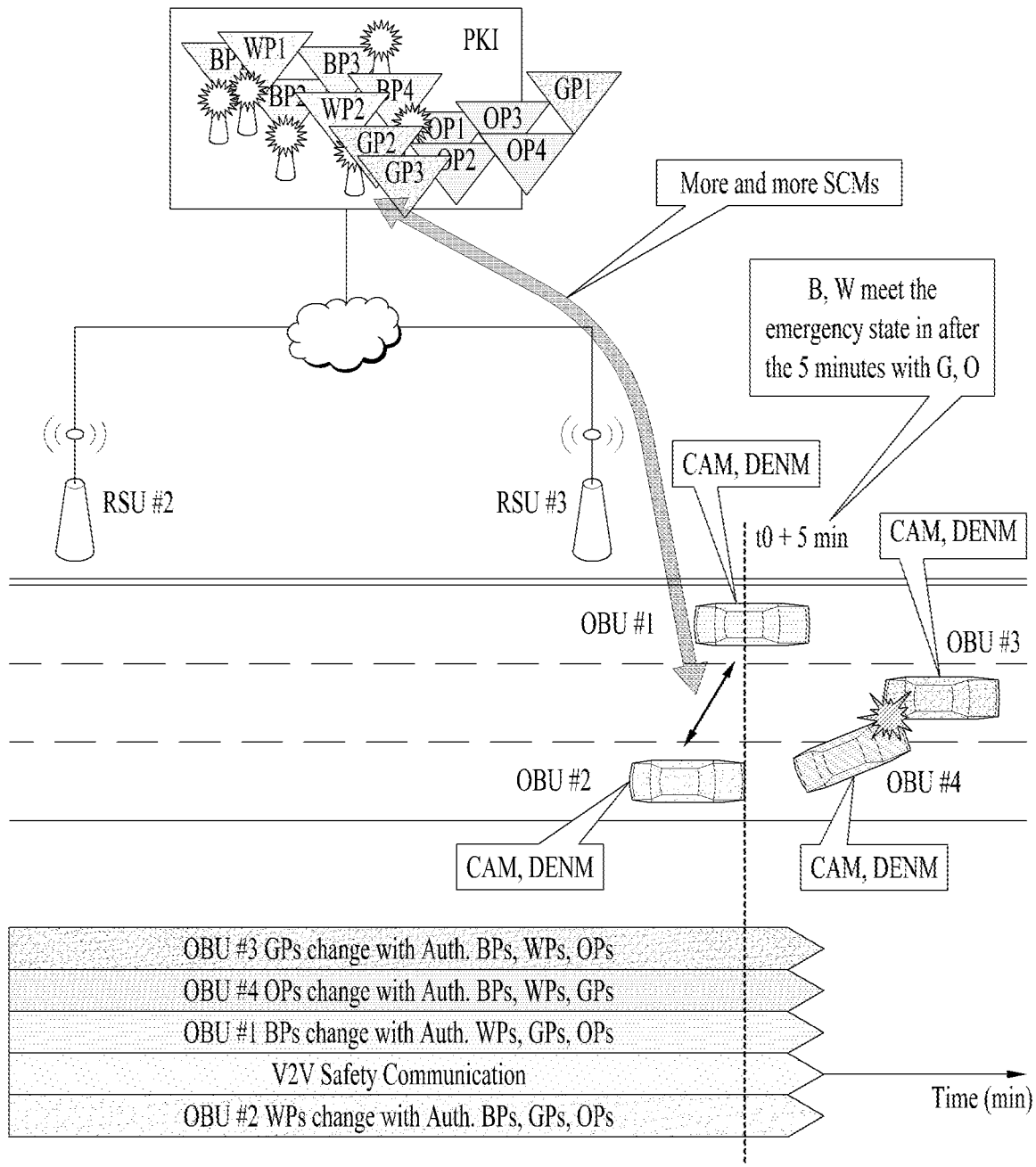
FIG. 7 is a diagram illustrating a case that transmission signals of a mobile ITS station are concentrated on a network node in a method of operating an mobile ITS station according to an embodiment of the present invention.

FIG. 7 is a diagram illustrating a case that transmission signals of a mobile ITS station are concentrated on a network node due to the occurrence of a congestion situation in a method of operating an mobile ITS station according to an embodiment of the present invention.

In FIGS. 4 to 6, a method of operating a mobile ITS station using a first interface has been explained with an example of two mobile ITS stations. Meanwhile, as shown in FIG. 7, it may assume a situation that a message (e.g., CAM or DENM) related to a V2V signal and an SCM are concentrated on a network node from a plurality of mobile ITS stations.

If a V2V signal and an SCM are concentrated on a network node from a plurality of mobile ITS stations, the network node may fail to appropriately provide a service to a mobile ITS station. Hence, a method for a mobile ITS station to process a V2V signal and an SCM signal, respectively, using a separate communication interface is explained in the following according to an embodiment of the present invention.

Figure 8:
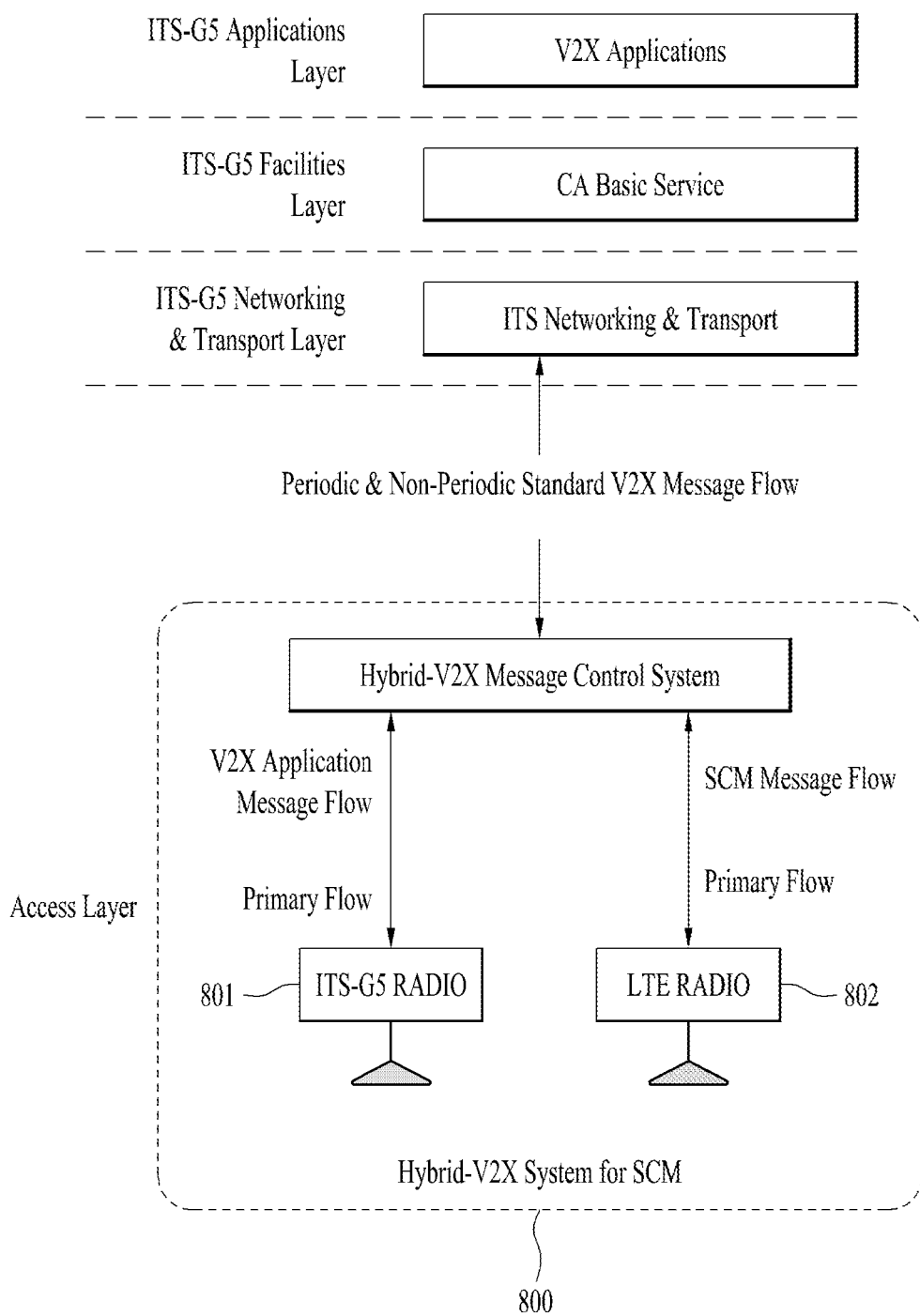
FIG. 8 illustrates a hybrid V2X (vehicle to everything) control system proposed by one embodiment of the present invention, a V2X application message according to the hybrid V2X control system, and an operation flow for an SCM.
Figure 10:
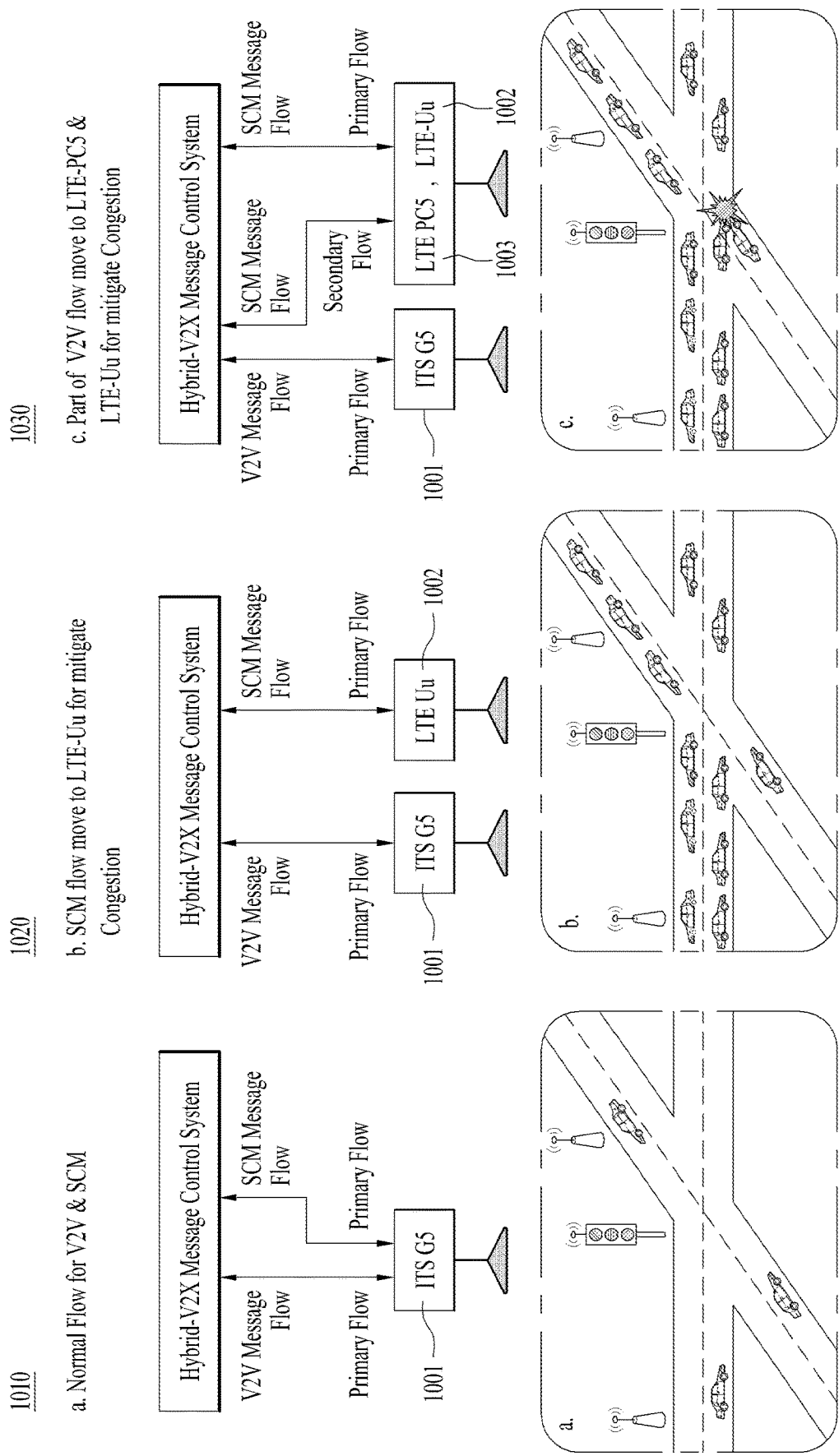

A method of providing a V2X application service including an SCM and a support service (e.g., SAM, SRM) and a method of reducing SCM burden are proposed with reference to FIGS. 8 to 10. FIG. 8 is a diagram illustrating a hybrid V2X (vehicle to everything) control system according to an embodiment of the present invention.

FIG. 8 illustrates a hybrid V2X (vehicle to everything) control system proposed by one embodiment of the present invention, a V2X application message according to the hybrid V2X control system, and an operation flow for an SCM. One embodiment of the present invention proposes an operation method of a mobile ITS (intelligent transport system) station including a hybrid V2X control system 800 capable of supporting a first interface 810 according to a first communication scheme and a second interface 820 according to a second communication scheme at the same time.

The operation method of the mobile ITS station according to one embodiment of the present invention includes a method transmitting transmission signals of the mobile ITS station via the first interface 810 in a first traffic state and a method of defining a second traffic state distinguished from the first traffic state according to a traffic congestion level and whether or not an emergency situation occurs. In the second traffic state, an SCM (security credential message) among the transmission signals of the mobile ITS station is transmitted via the second interface 820 and signals other than the SCM among the transmission signals of the mobile ITS station are transmitted via the first interface 810.

Meanwhile, the second interface 820 according to the second communication scheme corresponds to an interface between the mobile ITS station and a network node. The hybrid V2X control system 800 can additionally include a third interface corresponding to an interface between the mobile ITS station according to the second communication scheme and a different mobile ITS station.

Meanwhile, the first communication scheme may correspond to IEEE 802.11-based communication scheme and the second communication scheme may correspond to 3GPP-based communication scheme. And, the first interface 810 may include the DSRC interface mentioned earlier in FIG. 1 or the ITS-G5 interface mentioned earlier in FIG. 2. And, the second interface 820 may include the 3GPP-based Uu interface mentioned earlier in FIG. 3 and the third interface can include a 3GPP-based PC5 interface.

FIGS. 9 and 10 are diagrams for explaining communication according to a message and a situation for providing a hybrid V2X (vehicle to everything) control system according to an embodiment of the present invention.

Referring to FIGS. 9 to 10, both a V2V signal and an SCM can be transmitted via a first interface 1001 in a first traffic state 1010. For example, if a traffic congestion level is low or an emergency situation does not occur, both a V2V signal and an SCM can be transmitted via IEEE 802.11-based ITS-G5 interface or a DSRC interface.

Meanwhile, as shown in the center of FIG. 10, if a traffic congestion level becomes higher or an emergency situation occurs, a mobile ITS station transmits an SCM via a second interface 1002 and transmits a signal other than the SCM via the first interface 1001 in a second traffic state 1020. The second interface 1002 corresponds to 3GPP-based LTE-Uu interface. In the second traffic state 1020, since messages are concentrated on a network node, the SCM is processed by a separate communication interface to reduce a message processing burden of the network node.

Meanwhile, as shown in the right of FIG. 10, it may be able to additionally define a third traffic state 1030 that a serious emergency situation (e.g., traffic accident) occurs or a high congestion level is maintained for more than prescribed time. In the third traffic state 1030, a mobile ITS station transmits a V2V signal among transmission signals of the mobile ITS station in a manner of dividing the V2V signal into the first interface 1001 and the third interface 1003 according to QoS (quality of service) of a V2X signal. The third interface 1003 corresponds to 3GPP-based LTE-PC5 interface. Meanwhile, in the third traffic state 1030, similar to the second traffic state 1020, the SCM is transmitted via the second interface 1002.

Figure 11:
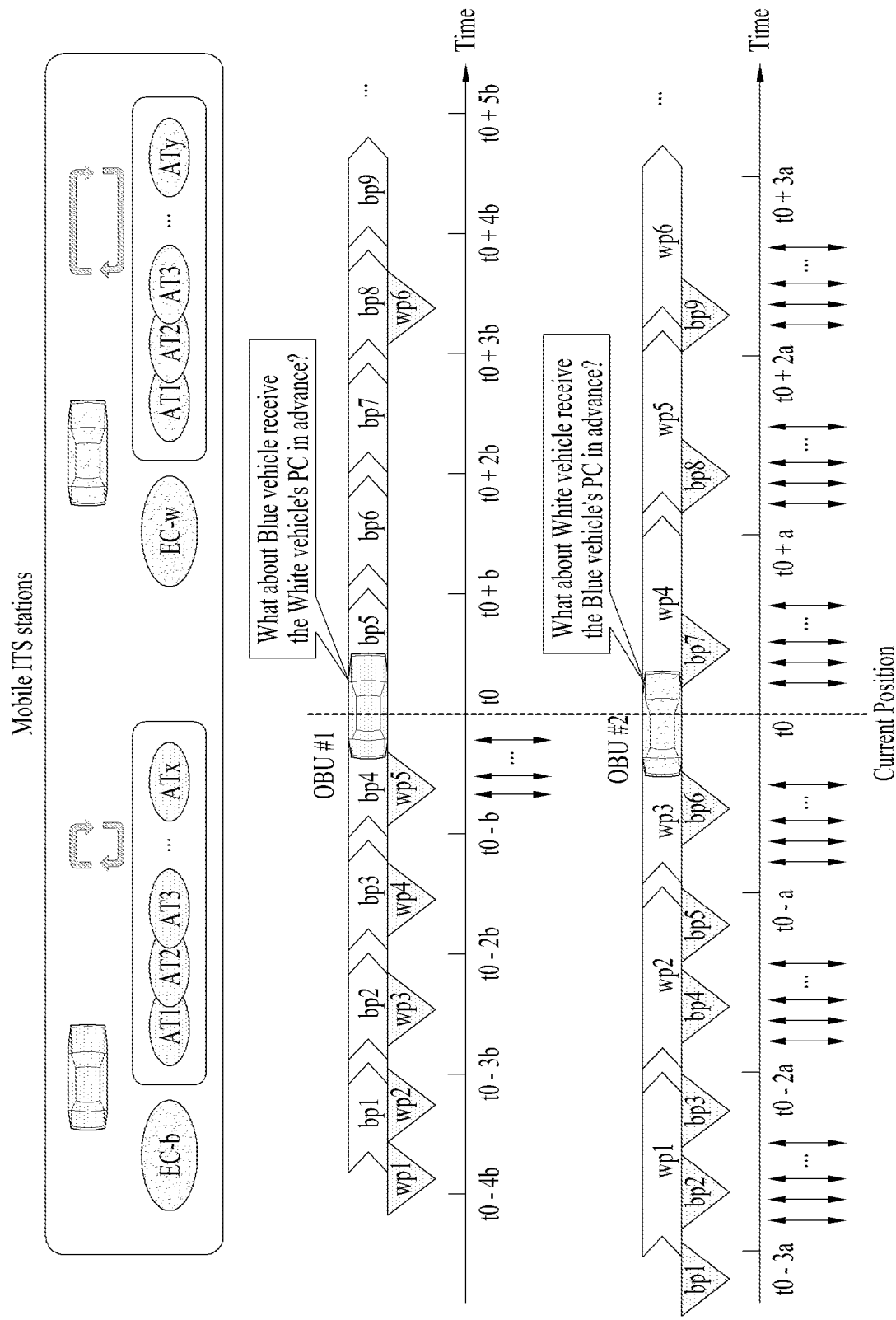
FIGS. 11 and 12 are diagrams for explaining a method of reducing a message processing burden of a network node via a hybrid V2X (vehicle to everything) control system according to a different embodiment of the present invention.
Figure 12:
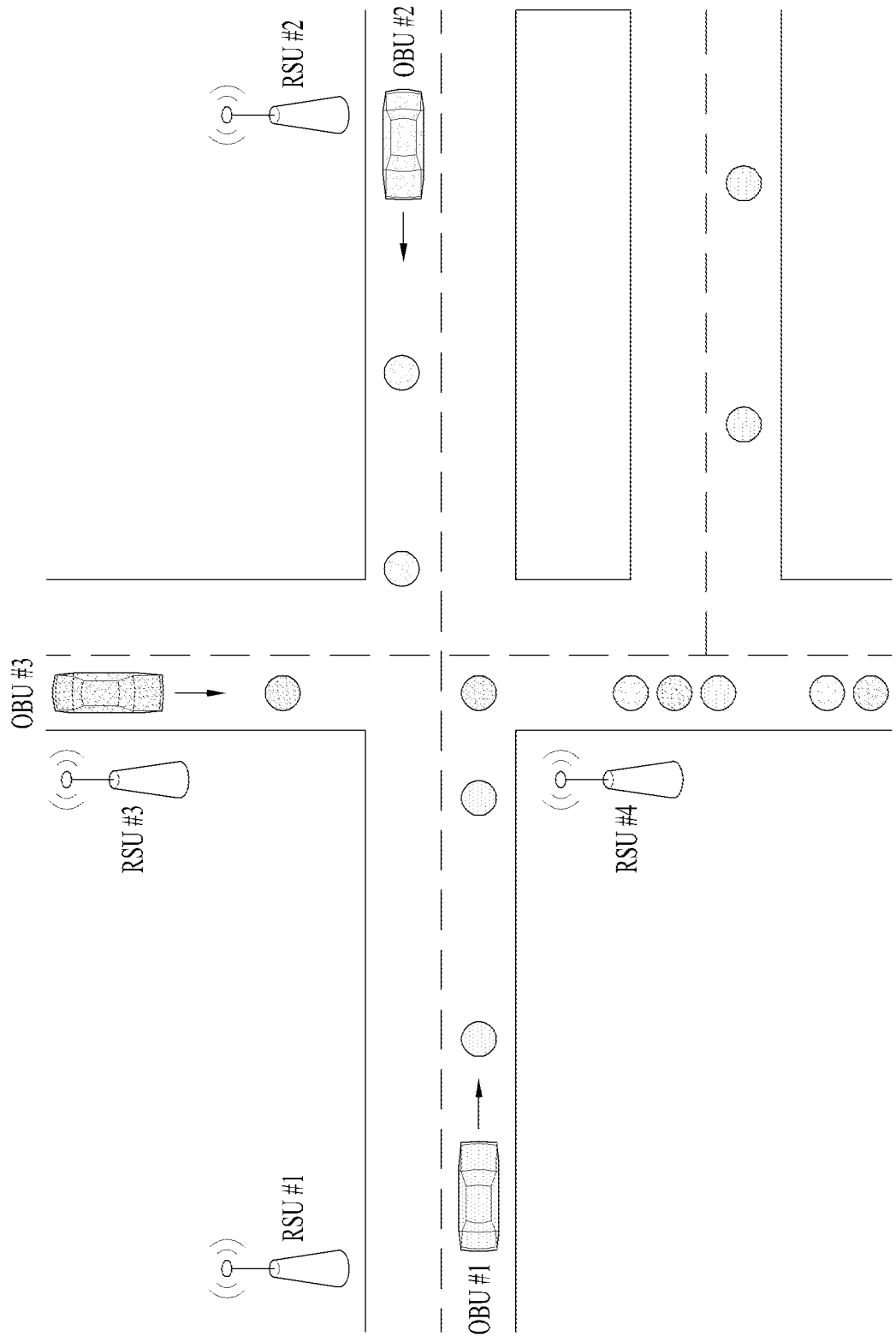

FIGS. 11 and 12 are diagrams for explaining a method of reducing a message processing burden of a network node via a hybrid V2X (vehicle to everything) control system according to a different embodiment of the present invention.

Prior to explaining an operation method of a mobile ITS station according to a different embodiment of the present invention, two preconditions are explained with reference to FIG. 11. As a first precondition, assume that each of mobile ITS stations is aware of a destination and an expected path of the mobile ITS station. As a second precondition, assume that all mobile ITS stations have its own EC and AT.

The present invention proposes an operation method of a mobile ITS station under the two preconditions. In particular, according to the present invention, mobile ITS stations transmit a first message including an SCM signal related to a specific expected point to a network node in consideration of an expected moving path and receive a second message related to an expected moving path of other mobile ITS stations from the network node.

An operation method of a mobile ITS station according to a different embodiment of the present invention is explained in the following with reference to FIG. 12.

Referring to FIG. 12, it is expected the a first mobile ITS station including an OBU #1, a second mobile ITS station including an OBU #2, and a third mobile ITS station including an OBU #3 will arrive at the vicinity of an RSU 4 after prescribed time (e.g., about 5 minutes) elapses.

According to the different embodiment, the mobile ITS station transmits a first message including an SCM signal related to a specific expected point to a network node in advance in consideration of an expected moving path. For example, the first to the third mobile ITS stations transmit the first message to an RSU 1 to an RSU 3, respectively.

According to the different embodiment of the present invention, the first message includes location information of the specific expected point, time information that the mobile ITS station will arrive at the specific expected point, and AT. For example, In FIG. 12, the first message corresponds to an ACPD (adaptive certificate pre-distribution) message and includes information (location information) of an RSU 4 at which the mobile ITS station will arrive and time information that the mobile ITS station will arrive at the RSU 4.

According to the different embodiment of the present invention, the mobile ITS station can additionally receive a second message from the network node. The second message can be generated in consideration of first messages of a plurality of mobile ITS stations.

For example, in FIG. 12, the RSU 1 to RSU 3 forward the first message, which is respectively received from the first to the third mobile ITS stations, to the RSU 4. Subsequently, the RSU 4 generates a second message using the received first message. The second message is configured by groups of authenticated ATs including effective time of the ATs. Lastly, if the effective time of the ATs arrives, the RSU 4 broadcasts the second message and the mobile ITS station receives the second message.

The present invention proposes a hybrid V2X (vehicle to everything) control system configured to process an SCM and a V2V signal, respectively, via a separate communication interface. By doing so, it is able to reduce latency for actual V2V safety via the hybrid V2X control system. When a congestion situation occurs, it is able to more flexibly handle the congestion situation via hybrid communication.

And, according to the present invention, among signals transmitted by a mobile ITS station, a V2V signal can also be processed via an ITS-G5 interface and LTE-PC5 interface, respectively, according to QoS (quality of service) such as delay time, a signal priority, or the like. And, in case of an SCM, if ITS-G5 interface and LTE-Uu interface are variably applied depending on whether or not there is infrastructure in a specific region, coverage capable of performing V2V communication can be enlarged.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein. While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

What is claimed is:

1. A method of operating a mobile ITS (intelligent transport system) station containing a hybrid V2X (vehicle to everything) control system capable of supporting a first interface according to a first communication scheme and a second interface according to a second communication scheme at a same time, wherein the first communication scheme corresponds to an IEEE 802.11-based communication scheme and wherein the second communication scheme corresponds to a 3GPP-based communication scheme, the method comprising: transmitting transmission signals of the mobile ITS station via the first interface in a first traffic state; distinguishing the first traffic state and a second traffic state based on both a traffic congestion level and whether an emergency situation occurs or not; transmitting an SCM (security credential message) among the transmission signals of the mobile ITS station via the second interface in the second traffic state when the emergency situation occurs; transmitting a signal other than the SCM among the transmission signals of the mobile ITS station via the first interface in the second traffic state, wherein the SCM corresponds to a signal related to issuance, revocation, or reactivation of an AT (authorization ticket) which is used for authorizing a message between mobile ITS stations; and transmitting a first message containing an SCM signal related to a specific expected point to a network node in consideration of an expected moving path, wherein the first message comprises location information of the specific expected point, time information of the mobile ITS station expected to arrive at the specific expected point, an EC (enrollment certificate) and the AT.

2. The method of claim 1, wherein the SCM corresponds to a signal related to issuance, revocation, or reactivation of at least one of the EC.

3. The method of claim 1, wherein the signal other than the SCM among the transmission signals of the mobile ITS station contains a V2V (vehicle-to-vehicle) signal.

4. The method of claim 1, wherein the second interface according to the second communication scheme corresponds to an interface between the mobile ITS station and a network node and wherein the hybrid V2X control system additionally contains a third interface corresponding to an interface between the mobile ITS station according to the second communication scheme and a different mobile ITS station.

5. The method of claim 4, further comprising the step of defining a third traffic state distinguished from the first traffic state and the second traffic state according to the traffic congestion level and whether or not the emergency situation occurs, wherein a V2V signal among the transmission signals of the mobile ITS station is transmitted in a manner of being distributed to the first interface and the third interface according to QoS (quality of service) of a V2X signal in the third traffic state and wherein the SCM signal among the transmission signals is transmitted via the second interface.

6. The method of claim 1, further comprising the step of receiving a second message from a network node, wherein the second message is generated in consideration of the first message of the mobile ITS stations.

7. The method of claim 1, wherein the first interface corresponds to an ITS-G5 interface, wherein the second interface corresponds to a 3GPP-based Uu interface, and wherein a third interface corresponds to a 3GPP-based PCS interface.

8. A mobile ITS (intelligent transport system) station containing a hybrid V2X (vehicle to everything) control system capable of supporting a first interface according to a first communication scheme and a second interface according to a second communication scheme at a same time, wherein the first communication scheme corresponds to an IEEE 802.11-based communication scheme and wherein the second communication scheme corresponds to a 3GPP-based communication scheme, the mobile ITS station comprising: a transceiver configured to transmit transmission signals containing an SCM (security credential message) signal of the mobile ITS station, and a processor configured to: control the transceiver to transmit the transmission signals of the mobile ITS station via the first interface in a first traffic state, control the transceiver to transmit an SCM (security credential message) among the transmission signals of the mobile ITS station via the second interface in a second traffic state when an emergency situation occurs, wherein the second traffic state is distinguished from the first traffic state based on both a traffic congestion level and whether the emergency situation occurs or not, wherein the SCM corresponds to a signal related to issuance, revocation, or reactivation of an AT (authorization ticket) which is used for authorizing a message between mobile ITS stations, control the transceiver to transmit a signal other than the SCM among the transmission signals via the first interface, and control the transceiver to transmit a first message containing the SCM signal related to a specific expected point to a network node in consideration of an expected moving path, wherein the first message comprises location information of the specific expected point, time information of the mobile ITS station expected to arrive at the specific expected point, an EC (enrollment certificate) and the AT.

9. The mobile ITS station of claim 8, wherein the SCM corresponds to a signal related to issuance, revocation, or reactivation of at least one of the EC.

10. The mobile ITS station of claim 8, wherein the signal other than the SCM among the transmission signals of the mobile ITS station contains a V2V (vehicle-to-vehicle) signal.

11. The mobile ITS station of claim 8, wherein the second interface according to the second communication scheme corresponds to an interface between the mobile ITS station and a network node and wherein the hybrid V2X control system additionally contains a third interface corresponding to an interface between the mobile ITS station according to the second communication scheme and a different mobile ITS station.

12. The mobile ITS station of claim 11, wherein the processor is configured to additionally define a third traffic state distinguished from the first traffic state and the second traffic state according to the traffic congestion level and whether or not the emergency situation occurs and wherein the processor is configured to control the transceiver to transmit a V2V signal among the transmission signals of the mobile ITS station in a manner of distributing the V2V signal to the first interface and the third interface according to QoS (quality of service) of a V2X signal in the third traffic state and transmit the SCM signal among the transmission signals is the second interface.

13. The mobile ITS station of claim 8, wherein the first interface corresponds to an ITS-G5 interface, wherein the second interface corresponds to a 3GPP-based Uu interface, and wherein a third interface corresponds to a 3GPP-based PCS interface.

* * * * *